Aug. 22, 1933.  P. J. JOHNSTON  1,923,731
LIQUID PRESSURE MEASURING APPARATUS
Filed Aug. 20, 1929
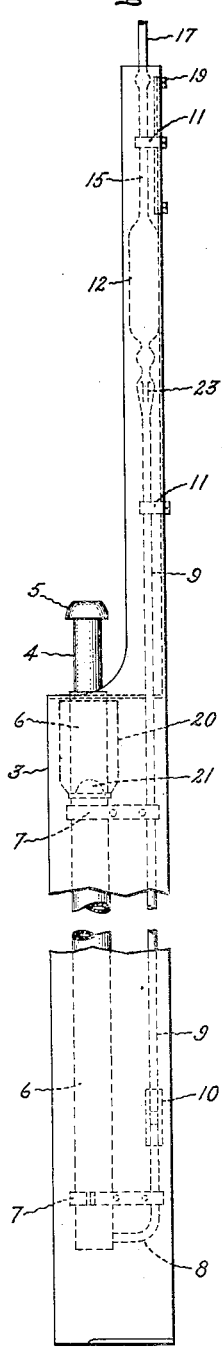
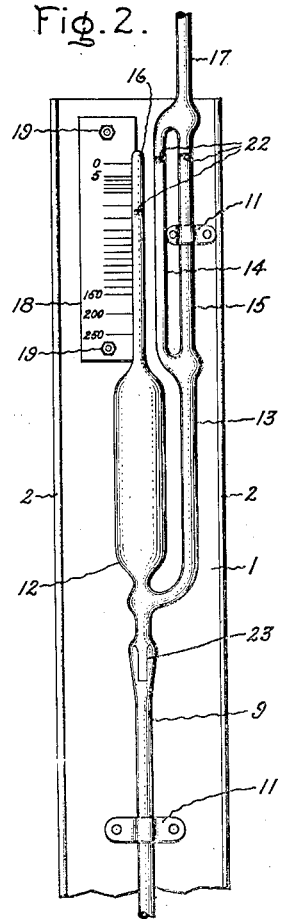
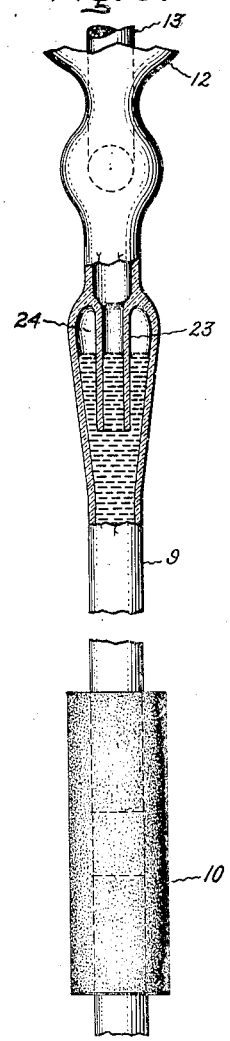
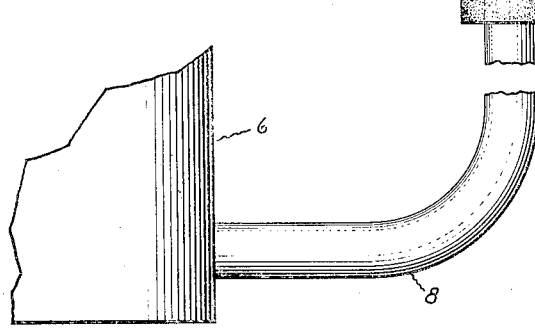
Inventor:
Philip J. Johnston,
by Charles E. Tullar
His Attorney.

Patented Aug. 22, 1933

1,923,731

UNITED STATES PATENT OFFICE 1,923,731

LIQUID PRESSURE MEASURING APPARATUS

Philip J. Johnston, Schenectady, N. Y., assignor to General Electric Company, a Corporation of New York Application August 20, 1929. Serial No. 387,175

6 Claims. (Cl. 73—31)

The present invention relates to measuring apparatus and more particularly to devices for determining the degree of vacuum in a partially evacuated envelope or the pressure of a gaseous medium in a closed container.

Devices of this character usually employ a liquid for measuring purposes, the level of the liquid being controlled by a plunger-cylinder arrangement which serves to displace the liquid in a reservoir which is located at one end of a U-shaped tube, thus raising the level of the liquid in both sides of the U-shaped tube. The end of the U-shaped tube containing the reservoir is open to the atmosphere and the other end terminates in two parallel paths or tubes of constricted size. One of the two parallel paths communicates with the envelope containing the gaseous medium whose pressure is to be determined. The other parallel path or tube is closed and is adapted to receive a relatively small quantity of the medium which is compressed therein by the liquid column. The liquid is also admitted to the parallel tube which is open to the envelope, the liquid rising to a higher level in this path than in the path containing the compressed gas. The difference in the levels of the liquid provides a liquid column whose weight balances the preponderance of pressure of the compressed gas over that of the gas in the envelope and this difference may be calibrated in terms of gas pressure as measured from the vacuum standard. When the plunger is raised in the cylinder the parallel tubes are emptied of the liquid which then assumes its original position in the U-tube.

In gages of this character the small, horizontal portion of the U-shaped member is usually made of metal while the upright column through which the liquid is forced is constituted of a tubing of transparent material such as glass. The glass and metal pieces are joined together usually by a length of rubber tube in order to offer flexibility to the joint. In this type of liquid pressure gage, it has been found normally that there is a discoloration or light-opaque film formed over the interior surface of the glass at the place where the difference in liquid levels is read which may preclude accuracy of the readings and in extreme cases as when the discoloration is particularly dark, may prevent even a rough approximation of the levels. This film adheres most tenaciously to the glass so that it is impossible to remove the same except that the gage be taken apart and the tubing be given a chemical wash, an expensive treatment which may entail breakage of the tubing.

It is believed that this discoloration or film is the result of dirt or other foreign matter collecting in the system due to either an impurity in the mercury or else foreign material adhering to or within the rubber tube which joins together the metal and the glass portions. This material tends to ride on the top of the mercury at the periphery thereof the latter depositing the said material on the glass tubing when the mercury columns recede after being forced into the system for a reading. There is also the possibility that air leakage at the junction between the rubber and the metal or thru the pores of the rubber may add its deleterious effect to that already present in the tube by way of producing a greater degree of light-opacity to the film. Whatever be the source of the material which renders the interior surface of the tubing opaque at the reading scale level or the manner in which such material is transformed into the film, I have discovered that by providing a closed pocket or trap at the proper position in the gage for collecting the film-producing material, the formation of the discoloration which interferes with the accurate determination of the liquid levels is prevented or reduced in substantial degree. Other objects and features will be apparent as the specification is perused in connection with the accompanying drawing in which Fig. 1 is a side elevational view, partly broken away, of a liquid gage made in accordance with the present invention; Fig. 2 is an enlarged front view illustrating the upper or reading portion of the gage, while Fig. 3 is an enlarged fragmentary side view showing one specific example of the improved film-preventing accessory, also depicting the rubber tube which is believed to be one of the sources of contamination of the mercury giving rise to the discoloring film.

In the drawing, numeral 1 designates the back plate or wall portion of a frame, along the edges of which extend flanges 2, 2 terminating in a semicircular compartment or housing 3. The back member 1 extends downwardly to the top of the housing a distance approximately one-half the length of the gage leaving the rear of the housing 3 open to position the lower portion of the gage in place. The housing is completely closed at the bottom and there is an opening at the top sufficiently large slidably to accommodate a plunger 4 provided with a hand knob 5. The plunger fits loosely in a cylindrical reservoir 6 usually fabricated of metal, which constitutes a portion of a U-shaped tubular system containing mercury or other liquid. The cylinder 6 may be secured to the sides of the housing by brackets 7, 7 riveted in place. The lower end of the cylinder 6 is fitted with a transversely extending conduit 8 secured in place by the brackets which hold the cylinder and bend upwardly to align with the glass tubing 9 which is held in position to the back plate member by brackets 11. The conduit and tubing are flexibly joined together by a rubber piece 10. The upper end of the tubing 9 is formed into a forked system the branches of which comprise a compression reservoir 12 and a tubing 13 terminating in two parallel legs 14, 15. The reservoir is sealed at the top to a closed glass tube 16 of uniform bore and of capillary or fine dimension. The leg 14 is located in juxtaposed relation and parallel to the tube 16 and is of the same bore as the latter. The legs 14 and 15 are converged at their upper end into a common tube 17 which may be connected to the system being evacuated or to the closed container whose gas pressure is to be determined. There is a pressure-reading scale 18 secured to the back plate 1 by bolts 19 and located slightly behind and to one side of the capillary 16. There is also provided an overflow chamber 20 secured to the cylinder 6 and communicating therewith by a pair of oppositely disposed apertures or openings 21. This chamber serves the purpose of accommodating the excess mercury which rises in the cylinder 6 when the plunger 4 is pressed too rapidly or when normally depressed and there is no vacuum on the gage, which mercury normally would spill between the plunger and the cylinder over the top of the housing and hence lost. The provision of the overflow chamber has been disclosed and claimed in an application Serial No. 379,299 filed July 18, 1929, in the names of C. V. Hardy and P. J. Johnston and entitled Liquid pressure measuring apparatus, which application resulted in issuing Patent No. 1,871,410, Aug. 9, 1932.

It has been found in practice that after the mercury is forced upwardly by the plunger 4 into the U-shaped system for pressure-reading purposes and then is allowed to recede by withdrawing the pressure of the plunger there is usually left on the interior surface of the tubes 14, 15 and 16 at the pressure-reading level, a light-opaque film indicated roughly by numeral 22. The film is particularly disadvantageous at the place where the difference of levels in the mercury is read in that it precludes accuracy in the pressure determinations.

While various reasons may be advanced as to the manner in which the film is formed, I believe it to be the result of material collected on the surface of the mercury and adhering by surface tension to the glass when the mercury level drops and by chemical reaction is transformed into a form of permanent discoloration. The source of this film-forming material may reside in the rubber tubing by way of unavoidable impurities or may be introduced into the system by air leakage thru the pores of the rubber or at certain of the joints in the system particularly at the place where the rubber tubing joins the metal and glass members together; the source may also constitute an impurity or contamination of the mercury. Whatever be the correct reasons for the formation of the film, I have discovered in accordance with my invention that if a small reentrant tube be provided in the right leg of the U-shaped system as shown, at a position in which the reentrant member is partly submerged by the mercury in its non-reading or initial position, the film which ordinarily would form, now adheres to the reentrant tube and hence attaches itself to the glass at a place remote from the pressure-reading position. I have illustrated the reentrant tube 23 as being located slightly below the compression reservoir 12, the tubing 9 being enlarged at this place to accommodate the reentrant member. While I have shown in Fig. 2, the presence of the discoloring film at the pressure-reading position in a gage which also employs the improved reentrant member, it will be understood that the showing is simply for explanatory purposes and that the film under these conditions will adhere to the large portion of the glass tube 9 in the region of the reentrant member. It will be noted by reference to Fig. 3 that when the non-reading or initial level of the mercury is intermediate the length of the member 23 there is formed in effect a closed chamber 24 from which any particles lodging on the peripheral edge of the mercury surface cannot escape. Moreover, in the event that the mercury has been moved past this member when the plunger is operated and dirt or air gains access into the system this material normally travels up the walls of the glass toward the top of the mercury and is also entrapped by the pocket 24. In order to prevent the gas which is entrapped in the closed chamber from escaping through the central opening of the reentrant member 23, it is necessary to keep the lower portion of the opening covered by the mercury. Hence, it is imperative that the reentrant member have sufficient length to accommodate barometric changes so as not to uncover the opening; moreover, the pocket 24 should be devoid of mercury even in the case of a high barometer. The reentrant member thus serves the purpose of a filter for removing gas and solid particles from the mercury which normally would cause formation of a light-opaque film at the pressure-reading position, at the same time offers substantially no impediment to the liquid which is free to move through the opening in the member. It will be evident that while I have specifically illustrated and described the provision of a closed chamber formed by a reentrant member for entrapping the film-forming material, the present invention is not limited to this construction but contemplates all means for trapping or otherwise removing this material from the portion of the mercury column in the region of the pressure-reading position. However, the closed pocket construction has been found to operate particularly satisfactory in maintaining the interior surface of the glass tubing, clean and transparent.

The operation of the device, for measuring pressure is well known in the art and it is sufficient to state that the gas whose pressure is to be determined is trapped in the reservoir 12 and compressed in the closed tube 16 so that when the column of mercury is forced against the pressure of the trapped gas the height of the mercury column will be less in the closed tube than in the adjacent tube 14. The difference in the height of the two columns conveniently is read on the scale 18 which obviously gives a reading of pressure which may be translated into vacuum or pressure standards.

What I claim as new and desire to secure by Letters Patent of the United States, is:

1. In a liquid pressure gage, the combination of tubing, a body of liquid in said tubing, means for moving the liquid into a pressure-reading position, the liquid being characterized in that it contains contaminating material which forms a vision-obstructing film on the tubing at the pressure-reading position, means for collecting the contaminating material at a place remote from the said position whereby formation of the film is precluded, said means comprising a closed chamber constructed and arranged to entrap the said material at a position remote from the pressure-reading position.

2. In a liquid pressure gage, the combination of glass tubing, a body of mercury in said tubing, means for moving the mercury into a pressure-reading position, the interior surface of the tubing being normally characterized by discoloration of the glass when acted upon by the mercury whereby accuracy of reading is precluded, and means for preventing said discoloration, said means comprising a reentrant member positioned in the tubing.

3. In a liquid pressure gage, the combination of a U-shaped tubing one portion of which is constituted of fine glass and metal members flexibly joined together, a body of liquid in said tubing, means for moving the liquid into a pressure-reading position, the gage being characterized by leakage of foreign material in the region of said joint, said material moving toward the top of the liquid and normally depositing on the tubing at the pressure-reading position whereby a discoloration is formed which precludes accuracy of reading, means for entrapping the material before it is deposited at the pressure-reading position whereby the discoloration at this position is prevented.

4. In a liquid pressure gage, the combination of a U-shaped tubing one portion of which is constituted of fine glass and metal members flexibly joined together, a body of liquid in said tubing, means for moving the liquid into a pressure-reading position, the gage being characterized by leakage of foreign material in the region of said joint, the material moving toward the top of the liquid and normally depositing on the tubing at the pressure-reading position whereby a discoloration is formed which precludes accuracy of reading, means for entrapping said material before it is deposited at the pressure-reading position whereby the discoloration at this position is precluded, and means for depositing the material on the tubing at a position remote from the pressure-reading position.

5. In a liquid pressure gage, the combination of a reservoir, a glass tubing in juxtaposed relation and joined thereto, a body of liquid in the reservoir, a plunger adapted to be pressed into the reservoir for moving the liquid into a pressure-reading position in the tubing, said liquid being characterized in that it contains contaminating material which rises to the surface and forms a light-opaque film on the glass tubing at the pressure-reading position when the liquid recedes therefrom, means for collecting the contaminating material at a place remote from the pressure-reading position whereby formation of the film is precluded and accuracy of the reading is assured.

6. In a liquid pressure gage, the combination of a reservoir, a glass tube in juxtaposed relation and joined thereto, a body of liquid in the reservoir, a plunger adapted to be pressed into the reservoir for moving the liquid into a pressure-reading position in the tube, said liquid being characterized in that it contains a contaminating material which rises to the surface and forms a light-opaque film on the glass tube at the pressure-reading position when the liquid recedes therefrom, means for collecting the contaminating material at a place remote from the pressure-reading position whereby formation of the film is precluded and accuracy of the reading is assured, said means comprising a closed chamber which forms a trap for the said material but allows the liquid facility of movement through the glass tube.

PHILIP J. JOHNSTON.